(12) United States Patent
Hishinuma et al.

(10) Patent No.: US 8,955,652 B2
(45) Date of Patent: Feb. 17, 2015

(54) APPARATUS AND METHOD OF MANUFACTURING BRAKE LINING

(75) Inventors: Hidetoshi Hishinuma, Tokyo (JP); Takanori Omiya, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 1260 days.

(21) Appl. No.: 12/811,866

(22) PCT Filed: Jan. 7, 2009

(86) PCT No.: PCT/JP2009/050096
§ 371 (c)(1),
(2), (4) Date: Jul. 7, 2010

(87) PCT Pub. No.: WO2009/088026
PCT Pub. Date: Jul. 16, 2009

(65) Prior Publication Data
US 2010/0276237 A1    Nov. 4, 2010

(30) Foreign Application Priority Data

Jan. 9, 2008  (JP) .................................. 2008-002012

(51) Int. Cl.
*F16D 65/04*  (2006.01)
*F16D 69/00*  (2006.01)
*F16D 69/04*  (2006.01)

(52) U.S. Cl.
CPC ........ *F16D 69/04* (2013.01); *F16D 2069/0483* (2013.01); *F16D 2069/0491* (2013.01)
USPC ..................................... 188/250 B; D12/180

(58) Field of Classification Search
CPC ................ F16D 2069/0483; F16D 2069/0491; F16D 69/04
USPC ............. 188/250 B, 250 R, 251 A; 156/212; D12/180
See application file for complete search history.

(56) References Cited

U.S. PATENT DOCUMENTS

| | | | |
|---|---|---|---|
| 2,083,989 A * | 6/1937 | Eisenhardt | 523/159 |
| 4,401,197 A * | 8/1983 | Bohla et al. | 188/334 |
| 5,668,529 A * | 9/1997 | Kyrtsos | 340/454 |
| 5,971,112 A * | 10/1999 | Okada et al. | 188/250 B |

(Continued)

FOREIGN PATENT DOCUMENTS

| | | |
|---|---|---|
| DE | 197 51 914 | 5/1999 |
| EP | 1 270 982 | 1/2003 |

(Continued)

*Primary Examiner* — Robert A Siconolfi
*Assistant Examiner* — Charles Poon
(74) *Attorney, Agent, or Firm* — Drinker Biddle & Reath LLP

(57) ABSTRACT

A manufacturing apparatus 10 for manufacturing a brake lining 41 is provided with a support portion 33 for supporting a brake shoe 43, a compressing portion 20 for compressively bonding a strip-shaped brake lining 41 to a rim 43b by compressing a material and a mold portion 31, 32 including a mold frame 32 for shaping lateral surfaces of the brake lining 41 and a pressing member 31 for forming a frictional surface 41a of the brake lining 41 by pressing the material, so as to shape the brake lining 41. The mold frame 32 has a first molding surface 32a for shaping a first side plane 41b, a second molding surface 32b for shaping a second side plane 41c and a third molding surface 32c disposed at a boundary portion between the first molding surface 32a and the second molding surface 32b for continuously connecting the first molding surface 32a with the second molding surface 32b by a curved surface.

1 Claim, 6 Drawing Sheets

(56) References Cited

U.S. PATENT DOCUMENTS

| | | | |
|---|---|---|---|
| 6,681,902 B1* | 1/2004 | Siekas et al. | 188/70 R |
| 7,550,056 B1* | 6/2009 | Merhar | 156/307.3 |
| 2003/0057038 A1* | 3/2003 | Kesavan et al. | 188/250 B |
| 2007/0056816 A1* | 3/2007 | Hayford et al. | 188/250 B |
| 2008/0251330 A1* | 10/2008 | Kobayashi | 188/250 B |
| 2009/0159380 A1* | 6/2009 | Kobayashi et al. | 188/251 A |

FOREIGN PATENT DOCUMENTS

| | | | |
|---|---|---|---|
| JP | 57-97934 | | 6/1982 |
| JP | 62-71422 | | 5/1987 |
| JP | 10-78066 | | 3/1998 |
| JP | 2002-295541 | | 10/2002 |
| JP | 2002295541 A | * | 10/2002 |
| JP | 2007-2867 | | 1/2007 |

\* cited by examiner

⇐ FORCE EXERTED BY UPPER MOLD

← FORCE RECEIVED BY MATERIAL

APPARATUS AND METHOD OF MANUFACTURING BRAKE LINING

TECHNICAL FIELD

The present invention relates an apparatus and method for manufacturing a brake lining.

BACKGROUND ART

There is a drum brake as one of braking systems for braking a vehicle. The drum brake is structured by a brake drum which rotates together with an axle, a shoe assembly which is disposed in an interior of the brake drum so as to be brought into contact with an inner circumferential surface of the drum to thereby braking a rotation of a wheel, a cylinder for moving the shoe assembly so as to bring it into contact with the inner circumferential surface of the drum, and so on.

As techniques for manufacturing shoe assemblies of the drum brakes, there are known a technique for compressively molding a lining by pressing a material of a lining on to a rim of a shoe (for example, refer to Patent Document 1) and a technique for bonding a pre-molded lining to the rim of the shoe (for example, Patent Document 2).

Patent Document 1: JP-A-2002-295541
Patent Document 2: JP-A-2007-002867

When the lining is compressively molded on the rim by pressing the material of the lining to the rim, an uniformity in density of the lining and a mold release characteristics become problems. Since a surface on which the lining is compressively molded is a circumferential surface, the material of the lining cannot be compressed uniformly from a portion in proximity to a center to a portion in proximity to an end of the lining. Since the surface on which the lining is molded and the direction in which the material is compressed are not at right angles to each other in particular at the end portion of the lining, the material cannot be sufficiently compressed, and hence it becomes difficult to have a uniform density at the end portion.

SUMMARY OF INVENTION

One or more embodiments of the invention provide an apparatus and a method for manufacturing a brake lining which improve a mold release characteristics of a lining in a compressively molding the lining onto a rim.

According to one or more embodiments of the invention, an end portion of lateral surfaces of the lining is formed into a curved surface.

In accordance with one or more embodiments of the invention, a brake lining manufacturing apparatus, for compressively molding a brake lining of a drum brake on an outer circumferential surface of a rim of a brake shoe, is provided with: a support portion for supporting a brake shoe; a compressing portion for compressively bonding a strip-shaped brake lining to a rim of the brake shoe by compressing a material for the lining which is disposed on an outer circumferential surface of the rim supported by the support portion; and a mold portion including a mold frame for shaping lateral surfaces of the brake lining and a pressing member adapted to slide within a frame of the mold frame when pressed by the compressing portion to thereby press the material to shape a frictional surface of the brake lining, so as to shape the brake lining when the compressing portion compressively bonds the material to the rim. The mold frame is provided with: a first molding surface for shaping a first side plane of said lateral surfaces of the brake lining which is parallel to a longitudinal direction of the brake lining; a second molding surface intersecting the first molding surface and for shaping a second side plane of said lateral surfaces of the brake lining which is parallel to a widthwise direction of the brake lining; and a third molding surface which continuously connects the first molding surface and the second molding surface by a curved surface for shaping a surface of said lateral surfaces of the brake lining which constitutes a boundary portion between the first side plane and the second side plane.

The above brake lining manufacturing apparatus is intended to mold the brake lining for the drum brake and compressively molds the brake lining on the rim of the brake shoe. Namely, the brake lining is compressively molded on the rim by pressing the material for the brake lining disposed on the rim by the pressing member.

Here, since the drum brake is designed so as to generate a braking force by pressing the lining which is a frictional material against an inner circumferential surface of a drum, the brake lining is formed so as to have a circumferential frictional surface. Consequently, when the lining is compressively molded by pressing the material for the lining to the outer circumferential surface of the rim, there are portions where the molding surface which molds the frictional surface of the lining intersects the compressing direction at right angles and where the molding surface intersects the compressing direction obliquely. If the molding surface which molds the frictional surface of the lining intersects the compressing direction at right angles, the compression force is transmitted to the material with good efficiency, whereby the material is compressively molded with good efficiency. This is because the compression force is not dispersed in directions which are different from the compressing direction. On the other hand, if the molding surface which molds the frictional surface obliquely intersects the compressing direction, the compressing force is transmitted to the material less efficiently than the case in which the molding surface intersects the compressing direction at right angles. In particular, as the molding surface becomes more parallel to the compressing direction, the compressing force that is to be transmitted to the material is reduced gradually. Consequently, when the lining is compressively molded by pressing the material for the lining to the outer circumferential surface of the rim, the material density becomes the lowest at portions of the lining which lie in proximity to the end portions in the longitudinal direction thereof.

Although the lining needs to be removed from the mold after the compressively molding has been completed, in the event that there are portions whose material density is low, there may be a case in which the portions collapse to remain in the mold when the lining is removed from the mold. Then, in the mold frame of the manufacturing apparatus according to the invention, the first molding surface which shapes the side plane of the lining which is parallel to the longitudinal direction thereof and the second molding surface which shapes the side plane of the lining which is parallel to the widthwise thereof are continuously connected together by the third molding surface which is made up of the curved surface so that such fragile portions are not formed in the lining. By doing so, corner portions which are particularly fragile in the lining are formed round, whereby the end portions are made difficult to collapse, and the mold release characteristics are improved. In addition, by changing the shape of the end portions of the lining to which the molding pressure is difficult to be applied from the angular shape to the round shape, the compression area is reduced locally, and therefore, the molding surface pressure is increased, increasing the moldability of the end portions of the lining. By this, when the lining is compressively molded on the rim, the mold release characteristics of the lining are improved.

The rim may have an arc-shape, the pressing member may have a molding surface for shaping the frictional surface of the lining which is substantially parallel to the outer circumferential surface of the rim, and the compressing portion may compressively bond the brake lining to the outer circumferential surface of the rim by compressing the material disposed between the outer circumferential surface of the rim which is supported by the support portion and the pressing member so as to hold the material between the outer circumferential surface of the rim and the pressing member.

When the brake lining is compressively molded on the outer circumferential surface of the rim having the arc-shape, it is inevitable that there are produced portions where the compressing direction intersects the molding surface at right angles and where the compressing direction intersects the molding surface obliquely. As this occurs, the compressing force is not transmitted uniformly to the material. Namely, there are produced portions where the compressing force is transmitted to the material sufficiently and where the compressing force is not transmitted to the material sufficiently. However, according to the manufacturing apparatus described above, since the end portions in the longitudinal direction of the lining are formed round, even with the outer circumferential surface of the arc-shaped rim, the mold release characteristics of the lining are improved. In this patent application, "parallel" means that two lines extend at an equal interval and includes an idea that these two lines are not only straight lines but also are curved lines.

The boundary portion between the first side plane and the second side plane of the lining may be a portion where the material is difficult to be compressively bonded to the rim due to the orientation of the outer circumferential surface of the rim with respect to the compressing direction being oblique.

When the brake lining is compressively molded on the outer circumferential surface of the arc-shaped rim, the angles of portions of the frictional surface of the brake lining and the outer circumferential surface of the rim which lie in proximity to the end portions of the brake lining become most oblique with respective to the compressing direction. In other words, the compression force is made most difficult to be transmitted to the material lying in proximity to the end portions of the brake lining. By forming round the portions of the brake lining which lie in proximity to the end portions thereof and to which the compression force is made most difficult to be transmitted, the mold release characteristics of the lining are improved.

Moreover, in accordance with one or more embodiments of the invention, a brake lining manufacturing method, for compressively molding a brake lining for a drum brake on an outer circumferential surface of a rim of a brake shoe, is provided with the steps of: supporting the brake shoe; disposing a material for the brake lining on the outer circumferential surface of the rim; and compressively molding the brake lining by use of a mold portion including a mold frame for shaping lateral surfaces of the brake lining and a pressing member adapted to move within a frame of the mold frame to thereby press the material to shape a frictional surface of the brake lining so as to compressively bond the material to the rim by pressing the pressing member. The mold frame is provided with: a first molding surface for shaping a first side plane of said lateral surfaces of the brake lining which is parallel to a longitudinal direction of the brake lining; a second molding surface intersecting the first molding surface and for shaping a second side plane of said lateral surfaces of the brake lining which is parallel to a widthwise direction of the brake lining; and a third molding surface which continuously connects the first molding surface and the second molding surface by a curved surface for shaping a surface of said lateral surfaces of the brake lining which constitutes a boundary portion between the first side plane and the second side plane.

According to one or more embodiments of the invention, the apparatus and method for manufacturing a brake lining can be provided which improve the mold release characteristics of the lining when the lining is compressively molded on the rim.

Other aspects and advantages of the invention will be apparent from the following description and the appended claims.

Figure 1:
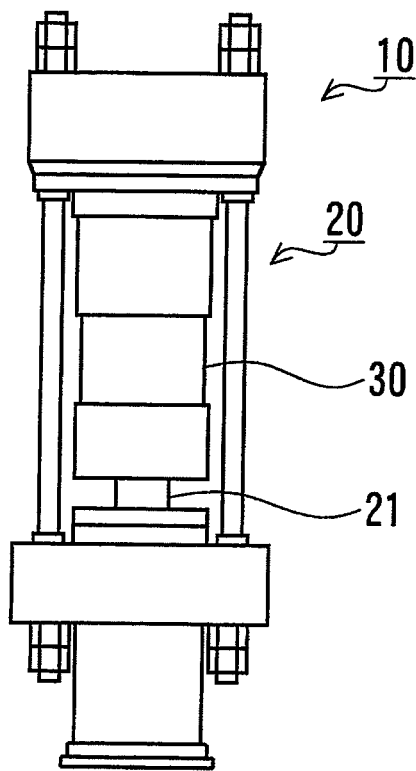
[FIG. 1] A front view of a manufacturing apparatus.

DESCRIPTION OF REFERENCE NUMERALS 10 manufacturing apparatus
20 press (compressing portion)
30 heating mold
31 upper mold (pressing member)
32a first molding surface
32b second molding surface
32c third molding surface
33 lower mold (support portion)
40 shoe assembly
41 lining
41a frictional surface
41b first side plane
41c second side plane
41d third side surface

DESCRIPTION OF EMBODIMENTS

Hereinafter, an apparatus and method for manufacturing a brake lining according to an exemplary embodiment of the invention will be exemplarily described. The exemplary embodiment manufactures a shoe assembly for a drum brake for use in slowing or stopping a moving vehicle.

<Configuration of Manufacturing Apparatus>

FIG. 1 is a front view of a manufacturing apparatus 10 (a brake lining manufacturing apparatus 10). As is shown in FIG. 1, the manufacturing apparatus 10 includes a press 20 (a compressing portion 20) and a heating mold 30.

The press 20 is a hydraulic press which includes a press cylinder 21 which operates hydraulically and compresses the heating mold 30 so as to hold it from thereabove and therebelow. In addition, the press 20 includes a heating unit, not shown, for heating the heating mold 30 to thermoform a lining 41.

Figure 2:
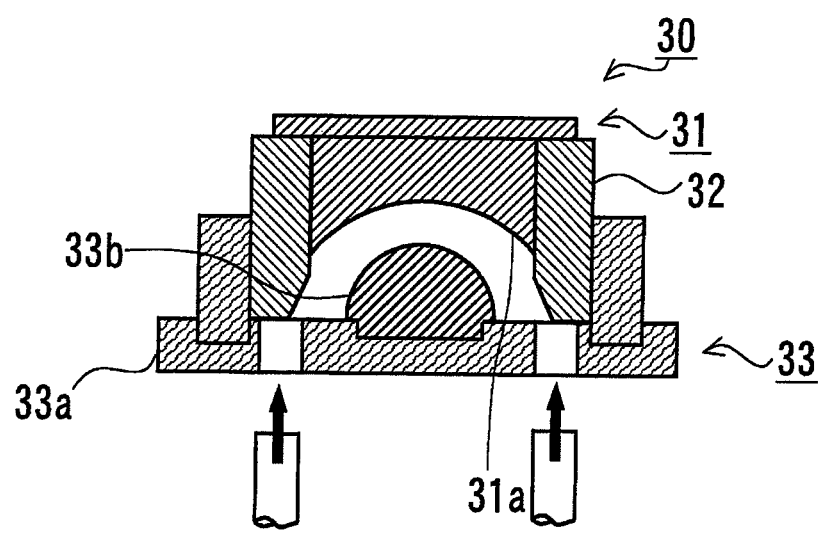
[FIG. 2] A front view of a heating mold.
Figure 3:
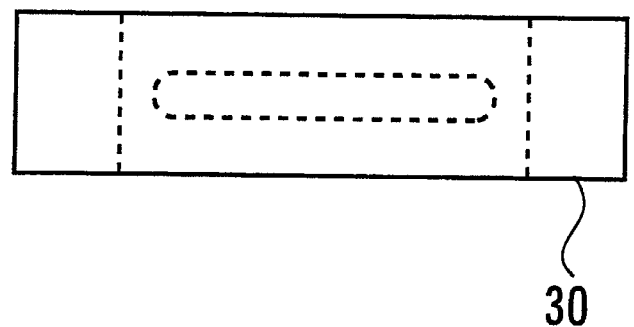
[FIG. 3] A top view of the heating mold.

The heating mold 30 is a heating mold for heat molding the strip-shaped brake lining 41 by compressing a material of the lining 41 together with the shoe 43. A structural view of the heating mold 30 seen from a front side is shown in FIG. 2, and a structural view seen from a top side is shown in FIG. 3. As shown in FIGS. 2 and 3, the heating mold 30 includes an upper mold 31 (pressing member 31), an inner mold 32 (mold frame 32), and a lower mold 33 (support portion 33). In the heating mold 30, the lining 41 is compressed and heat molded such that the lining 41 is pinched from an upper side of the material of the lining 41 set within the mold frame of the inner mold 32 by the upper mold 31 and from a lower side by the shoe 43.

The upper mold 31 is a member that is disposed on an upper side of the inner mold 32 and plays a role of shaping a frictional surface 41*a* of the lining 41 when the lining 41 is thermoformed. (Note that the frictional surface 41*a* of the lining 41 corresponds to a plane which includes a rotating direction (a circumferential direction) of a braking target to be slowed down or stopped (for example, a wheel) and a rotational axis direction of the braking target. This upper mold 31 has a molding surface 31*a* which compresses a material for the lining 41 to shape the frictional surface 41*a*.

Figure 4:
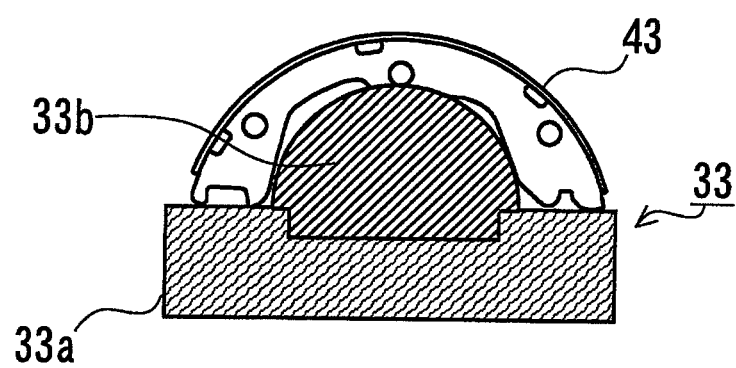
[FIG. 4] A diagram showing a supporting state of a shoe.

The lower mold 33 is a member that is disposed on a lower side of the inner mold 32. The lower mold 33 is configured so that a shoe support member 33*b*, which is a semicircular member, is disposed on a plate-shaped bottom plate 33*a*. When thermoforming is performed, the lower mold 33 supports a web 43*a* of a shoe 43. FIG. 4 is a diagram showing a state resulting when the shoe support member 33*b* supports the shoe 43. During thermoforming the shoe support member 33*b* supports the shoe 43 from therebelow in this state.

Figure 5:
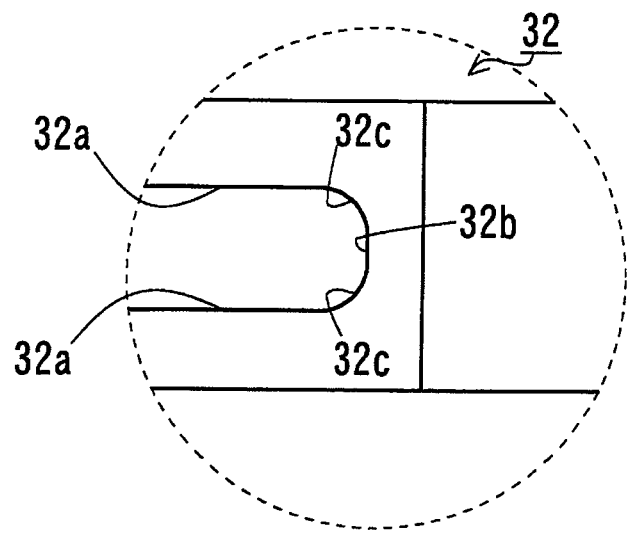
[FIG. 5] An enlarged view of a mold frame of an inner mold.

When thermoforming the lining 41, the inner mold 32 plays a role of shaping lateral surfaces of the lining 41. The inner mold has a rectangular parallelepiped external shape and has a mold frame for thermoforming the lining 41 in an interior thereof. In the inner mold 32, the mold frame has a rectangular shape when viewed from the top and is opened at top and bottom thereof. FIG. 5 is an enlarged view of part of the mold frame of the inner mold 32 which results when the inner mold 32 is viewed from the top. As is shown in FIG. 5, the inner mold 32 has a first molding surface 32*a* for molding a first side plane 41*b* which is a plane of the lateral surfaces of the lining 41 which is parallel to a longitudinal direction thereof, a second molding surface 32*b* for molding a second side plane 41*c* which is a plane of the lateral surfaces of the lining 41 which is parallel to a widthwise direction thereof and a third molding surface 32*c* which continuously connects the first molding surface 32*a* with the second molding surface 32*b* by a curved surface. (Note that the first side plane 41*b* of the lining 41 corresponds to a plane which includes the rotational direction and intersects the frictional surface, and the second side plane 41*c* of the lining 41 corresponds to a plane which includes the rotational direction and intersects the frictional surface. In addition, a third side surface 41*d*, which continuously connects the first side plane 41*b* with the second side plane 41*c* by the curved surface, is formed by the third molding surface 32*c*.)

<Operations of Manufacturing Apparatus>

Figure 6:
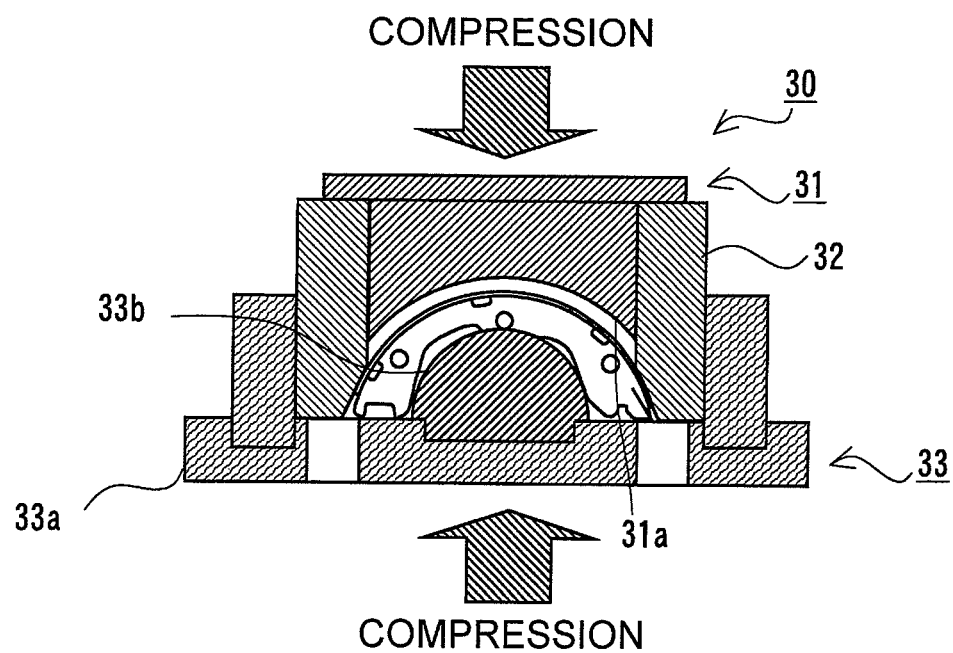
[FIG. 6] An explanatory diagram explaining operations of the manufacturing apparatus.
Figure 7:
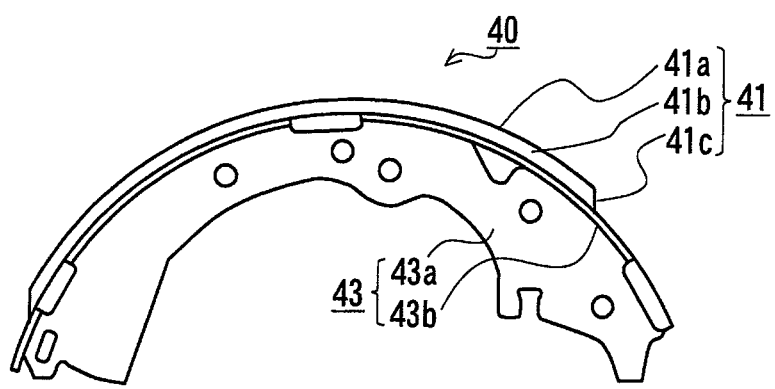
[FIG. 7] A front view of a shoe assembly.
Figure 8:
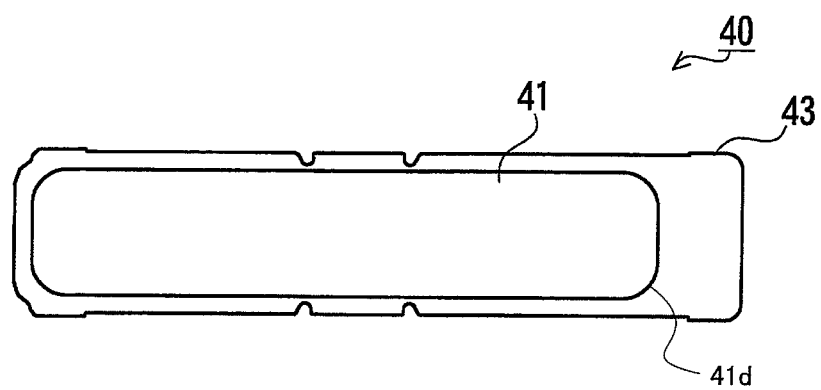
[FIG. 8] A top view of the shoe assembly.
Figure 9:
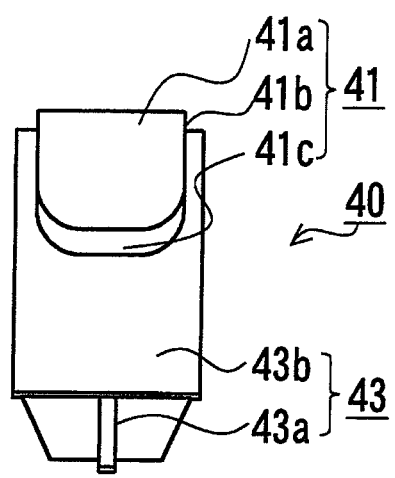
[FIG. 9] A left side view of the shoe assembly.
Figure 10:
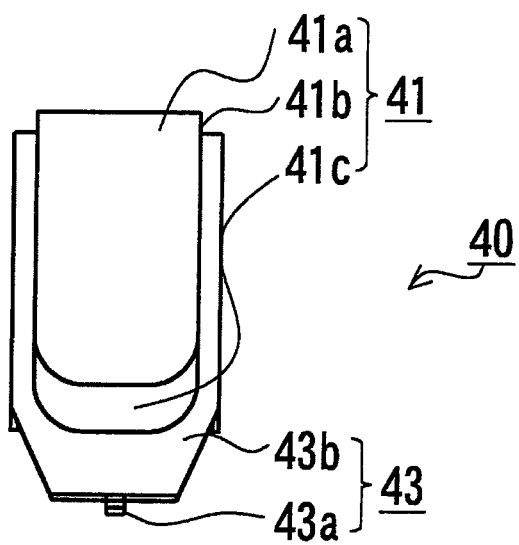
[FIG. 10] A right side view of the shoe assembly.

Next, operations of the manufacturing apparatus 10 will be described. FIG. 6 is an explanatory diagram explaining operations of the manufacturing apparatus 10. When the lining 41 is thermoformed, a mold release agent is applied to an interior of the mold frame of the inner mold 32 and the upper mold 31.

Next, the inner mold 32 is placed on the lower mold 33 in such a state that the shoe 43 is set on the lower mold 33. By doing so, a lower opening of the mold frame of the inner mold 32 is closely attached to an outer circumferential surface of a rim 43*b* of the shoe 43, producing a state in which the opening is closed. Next, a material for the lining 41 is introduced into the interior of the mold frame of the inner mold 32, and the upper mold 31 is placed on the inner mold 32. Next, the heating mold 30 is set in the press 20. Next, the press cylinder 21 of the press 20 is stretched out so as to heat and compress the material for the lining 41. When a certain length of time has elapsed since heating and compression were started, the press cylinder 21 is contracted, and a shoe assembly 40 in which the lining 41 is thermoformed is removed from the heating mold 30.

<Advantage of Manufacturing Apparatus>

FIGS. 7, 8, 9 and 10 are a front view, a top view, a left side view and a right side view of the shoe assembly 40 in which the lining 41 is thermoformed by the manufacturing apparatus 10, respectively. As is shown in FIGS. 7 to 10, the lining 41 is formed with its end portions rounded.

Figure 11:
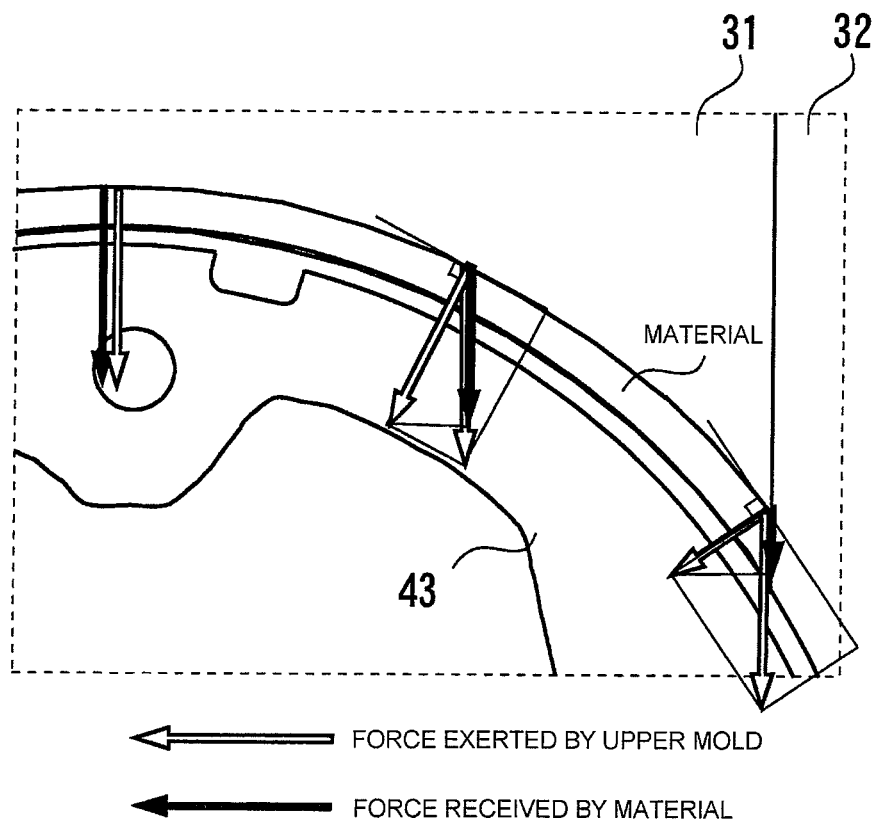
[FIG. 11] A diagram showing a relationship of forces exerted when compressively molding a lining.
Figure 12:
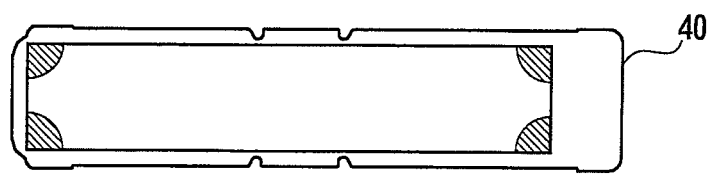
[FIG. 12] A diagram showing portions where material density is low.

Here, a relationship between forces will be described which results when the lining 41 is thermoformed on an outer circumferential surface of the rim 43*b* of the shoe 43. FIG. 11 is a diagram showing a relationship of forces exerted when compressively molding a lining. In FIG. 11, white arrows edged with a black line indicate directions and magnitudes of forces exerted on the material for the lining 41 by the upper mold 31, while thin black arrows indicate directions and magnitudes of forces which the material for the lining 41 receives from the upper mold 31. Since a molding surface on which the upper mold 31 presses against the material for the lining 41 is configured as a circumferential surface, as is shown in FIG. 11, as an angle of a contact surface of the material with respect to a pressing direction of the upper mold 31 becomes more acute, a force which the material receives from the upper mold 31 is dispersed more in a lateral direction, and a force exerted in the pressing direction is reduced gradually and becomes the least in proximity to an end portion of the lining 41. Because of this, the material density becomes the lowest at a portion lying in proximity to the end portion of the lining 41, and hence, the portion becomes fragile. FIG. 12 is a diagram showing in particular portions of the lining 41 whose material density is low by hatching them. As is shown in FIG. 12, when compressing the material for the lining 41 so as to compressively mold the lining 41 directly on the outer circumferential surface of the rim 43*b*, due to the material density at the end portions of the lining 41 being low, in the event that the end portions have angular corners, those angular corners become easy to collapse. For example, in the event that the inner mold 32 does not include the third molding surface 32 and hence the first molding surface 32*a* intersects the second molding surface 32*b* at right angles at the boundary portion, the end portions of the lining 41 become angular. Then, when the lining 41 is removed from the inner mold 32, the angular portions of the lining 41 collapse, leading to a fear that the material of the lining 41 remains within the mold frame of the inner mold 32. In the event that the material of the lining 41 remains in the mold frame of the inner mold 32, the material of the lining 41 accumulates at the boundary portion between the first molding surface 32*a* and the second molding surface 32*b* as a result of repetition of thermoforming, leading to a fear that the accumulation of the material of the lining 41 may cause a molding failure.

According to the manufacturing apparatus 10 of the exemplary embodiment, since the end portions of the lining 41 are formed round, the accumulation of the material of the lining 41 in the interior of the mold frame of the inner mold 32 is eliminated. This suppresses the occurrence of molding failure of the lining 41 and can improve the yielding of the lining 41. Note that while the end portions of the lining 41 are formed R1 to R10 (unit of mm) (that is the third side surface 41*d* becomes a curved surface having a radius ranging from 1 to 10 mm), needless to say, the end portions may only has to be formed into a continuous shape in which curved surfaces of different R's are connected with each other while including straight lines partially.

While the invention has been described in detail and by reference to the specific embodiment, it is obvious to those skilled in the art to which the invention pertains that various alterations and modifications can be made without departing from the spirit and scope of the invention.

This patent application is based on Japanese Patent Application (No. 2008-002012) filed on Jan. 9, 2008, the contents of which is to be incorporated in its entirety herein by reference.

INDUSTRIAL APPLICABILITY

The invention can be applied to apparatuses and methods for manufacturing brake linings.

The invention claimed is:

1. A shoe assembly of a drum brake comprising:

a shoe; and a lining composed of a frictional material and having a strip-shape and compressively molded on an outer circumferential surface of a rim of the shoe, wherein the lining includes a frictional surface and lateral surfaces, wherein the lateral surfaces include:

two first side planes which are parallel to a longitudinal direction of the lining;

two second side planes which are parallel to a widthwise direction of the lining; and a plurality of curved surfaces, wherein each of the first side planes is continuously connected to each of the second side planes by the curved surfaces, and wherein one of the second side planes is parallel to the other of the second side planes.

* * * * *